(12) United States Patent
Thurfjell et al.

(10) Patent No.: US 7,979,084 B2
(45) Date of Patent: Jul. 12, 2011

(54) METHOD AND APPARATUS RELATING TO POWER CONTROL

(75) Inventors: Magnus Thurfjell, Lulea (SE); Fredrik Hagglund, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 753 days.

(21) Appl. No.: 11/912,238

(22) PCT Filed: Apr. 22, 2005

(86) PCT No.: PCT/SE2005/000589
§ 371 (c)(1), (2), (4) Date: Oct. 22, 2007

(87) PCT Pub. No.: WO2006/112764
PCT Pub. Date: Oct. 26, 2006

(65) Prior Publication Data
US 2008/0194280 A1  Aug. 14, 2008

(51) Int. Cl.
*H04B 7/00* (2006.01)
(52) U.S. Cl. .... 455/522; 455/67.11; 455/69; 455/127.1; 370/318; 370/252
(58) Field of Classification Search .................. 455/561, 455/522, 509, 450, 63.1, 67.11, 434, 452.1, 455/464, 67.13, 436, 446, 453, 69, 437, 571, 455/452.2, 24; 370/318, 320, 252, 342, 335, 370/341, 441, 465, 468
See application file for complete search history.

(56) References Cited

U.S. PATENT DOCUMENTS

| | | | | |
|---|---|---|---|---|
| 5,987,307 A * | 11/1999 | Buskirk et al. | .................. | 455/73 |
| 6,118,983 A | 9/2000 | Egusa et al. | | |
| 6,163,705 A * | 12/2000 | Miya | .............................. | 455/522 |
| 6,347,231 B1 * | 2/2002 | Miya | .............................. | 455/522 |
| 6,405,021 B1 * | 6/2002 | Hamabe | .......................... | 455/69 |
| 6,414,948 B1 * | 7/2002 | Sato | .............................. | 370/335 |
| 6,621,808 B1 * | 9/2003 | Sadri | .............................. | 370/335 |

(Continued)

FOREIGN PATENT DOCUMENTS

EP  0 823 793 A2  2/1998
(Continued)

OTHER PUBLICATIONS

Almgren, M. et al. "Power control in a cellular system," *Vehicular Technology Conference, 1994 IEEE 44th*, vol., no., pp. 833-837 vol. 2, Jun. 8-10, 1994 dol: 10 1109/VETEC.1994 345207.

*Primary Examiner* — Sujatha Sharma

(57) ABSTRACT

The present invention pertains to power control in cellular networks (1). A power control algorithm (201) is operated to control transmission powers on radio links (downlinks and/or uplinks). An information collector (203; 127) is adapted to collect power distribution information indicating how the transmission powers of a selected plurality of radio links are distributed in a dynamic power range extending from a minimum power level Pmin to a maximum power level Pmax. A feedback generator (205; 129) is adapted to generate feedback for modifying the operation of the power control algorithm (201) based on the power distribution information. The feedback makes the operation of the power control algorithm (201) less sensitive to initial settings of operational parameters and varying conditions in the radio environment. The burden on the operator to select optimal settings for operational parameters is therefore lowered. The invention can be achieved using conventional measurement reports from user terminals.

17 Claims, 5 Drawing Sheets

U.S. PATENT DOCUMENTS

| | | | |
|---|---|---|---|
| 6,675,000 B1* | 1/2004 | Ichikawa | 455/127.3 |
| 6,967,987 B2* | 11/2005 | Higuchi et al. | 375/130 |
| 7,640,033 B2* | 12/2009 | Nakayama | 455/522 |
| 7,664,047 B2* | 2/2010 | Hamalainen | 370/252 |
| 7,715,863 B2* | 5/2010 | Khojastepour et al. | 455/522 |
| 2003/0189907 A1 | 10/2003 | Miyamoto | |
| 2004/0180686 A1* | 9/2004 | Nakayama | 455/522 |

FOREIGN PATENT DOCUMENTS

EP 1 304 816 A1 4/2003

\* cited by examiner

METHOD AND APPARATUS RELATING TO POWER CONTROL

TECHNICAL FIELD OF THE INVENTION

The present invention pertains to the field of cellular networks, and in particular to the part of this field that is concerned with power control.

BACKGROUND AND RELATED ART

Cellular networks include radio access nodes, such as base stations or radio access points, which provide radio access services to user terminals that are located in geographical regions—cells—associated with the radio access nodes. Communication between the user terminal and the radio access node is performed over radio links, which are either connections from the radio access node to the user terminal (downlinks) or connections from the user terminal to the radio access node (uplinks).

The cellular networks are often interference limited, i.e. the greatest source of interference on each radio link is transmissions on other radio links, and not e.g. thermal noise. Link quality on one radio link is thus dependent on a relationship between received signal strength on the one radio link and a sum of received signal strengths from all other radio links using the same channel simultaneously. As a consequence, a reduced transmission power on one radio link not only affects the link quality of that radio link negatively but may also improve the quality on other radio links due to reduced interference. Power control of transmissions on the radio links is therefore an important tool when optimising performance in the interference limited cellular network.

The basic idea behind power control is that transmitting at a power level that is higher than needed to achieve an acceptable quality, e.g. perceived speech quality, is only a source of increased interference towards the rest of the cellular network. Therefore, the transmission powers on such radio links should be reduced. In principle, both directions, i.e. uplink as well as downlink, benefit from power control. Power control on the uplink will also have the effect of reducing power consumption and increasing battery time in the user terminals.

The goal for a power control algorithm is to maximize the number of satisfied users in the cellular network. In other words, maximize the number of radio links with a link quality representing acceptable quality or better. Note that the goal is not necessarily to get every single user satisfied. It may, for example, be preferable to let one strong interferer reduce its transmission power below the quality level, if this can reduce interference enough to "lift" more than one other radio link above the quality level.

Details of power control algorithms may differ, but common for all is that information on current radio link quality is needed. Additionally, since the user terminals are normally mobile, radio conditions will change over time, making dynamic updating of quality information necessary. The power control algorithms normally use a number of operational parameters, which establish how the power control algorithm determines the transmission powers of radio links controlled by the power control algorithm. The non-trivial task of selecting appropriate values for the operational parameters lies with the operator of the cellular network.

In e.g. GSM, downlink power control is achieved using measurement reports that are repeatedly transmitted from the user terminal to the radio access node (base station). The reports include information describing the radio link quality measured by a receiver in the user terminal. The information is filtered and compared with a predefined target quality parameter used by the algorithm. In GSM, this target quality parameter is called qdes and defines a link quality level above which the transmitted power can be reduced. A corresponding uplink control does not rely on measurement reports, since it is the cellular network (base station controller) and not the user terminal that controls the power levels also for uplink transmissions. Instead, a command that informs each user terminal of the transmission power to use is sent downlink. The power control in GSM is based on the principles outlined in M. Almgren, H. Andersson and K. Wallstedt, 1994, "Power Control in a Cellular System", "Vehicular Technology Conference 94".

In e.g. WCDMA another principle is used. The goal here is to keep each user at a defined speech quality level. This is achieved by an inner loop that regulates towards a link quality target and a slower outer loop, which updates the link quality target dynamically to match the desired speech quality. The outer loop measures other link quality parameters that better correspond to the speech quality but requires longer measurement periods to get reliable values.

Although power control provides an important tool for improving performance, there are still many practical difficulties. Due to physical limitations, transmission powers are as a rule restricted to a dynamic power range, i.e. a predetermined interval extending from a minimum allowed power level (Pmin) to a maximum allowed power level (Pmax). The power control algorithm is hence restricted to choose transmission power levels that lie in the dynamic power range. Moreover, since speech quality is ultimately subjective and not easily measured as such, a corresponding radio link quality level (e.g. measurements of C/I, BER or FER) is normally used instead. The complex relationship between the measured radio link quality level and perceived speech quality makes it difficult to select values for operational parameters of the power control algorithm that relate to link quality entities. Service type (different speech coders), traffic load (the number of simultaneous connections), frequency reuse, frequency hopping etc. may also affect this relationship. Furthermore, it can be expected that the relationship may change over time due to changes in the above-mentioned conditions or other conditions. However, because of the ever-changing conditions, it is not certain that a selection of operational parameters that appeared good at one point time will necessarily be as good at a later point in time. In fact it is quite clear from the above that the power control algorithm cannot be expected to perform in an optimal manner at all times.

SUMMARY OF THE INVENTION

The present invention addresses a problem of improving power control of radio links in cellular networks wherein a power control algorithm is operated to control transmission powers on radio links.

The above-stated problem is solved in short according to the following. The power control algorithm controls the transmission powers within a predetermined dynamic power range. Power distribution information indicating how transmission powers on radio links are distributed within the dynamic power range is collected. Feedback is then generated based on the collected power distribution information. The generated feedback is suitable for modifying the operation of the power control algorithm. The invention includes methods as well as devices for addressing the above-stated problem.

An advantage of the invention is that the feedback makes the operation of the power control algorithm less sensitive to initial settings of operational parameters and varying conditions in the radio environment. The burden on the operator to select optimal settings for operational parameters is therefore lowered. Another advantage of the invention is that the invention can, if desired, be achieved using conventional measurement reports from the user terminals.

The person skilled in the art will appreciate that further objects and advantages are associated with particular embodiments of the invention.

The invention will now be described further using preferred embodiments and referring to the drawings.

PREFERRED EMBODIMENTS

Figure 1:
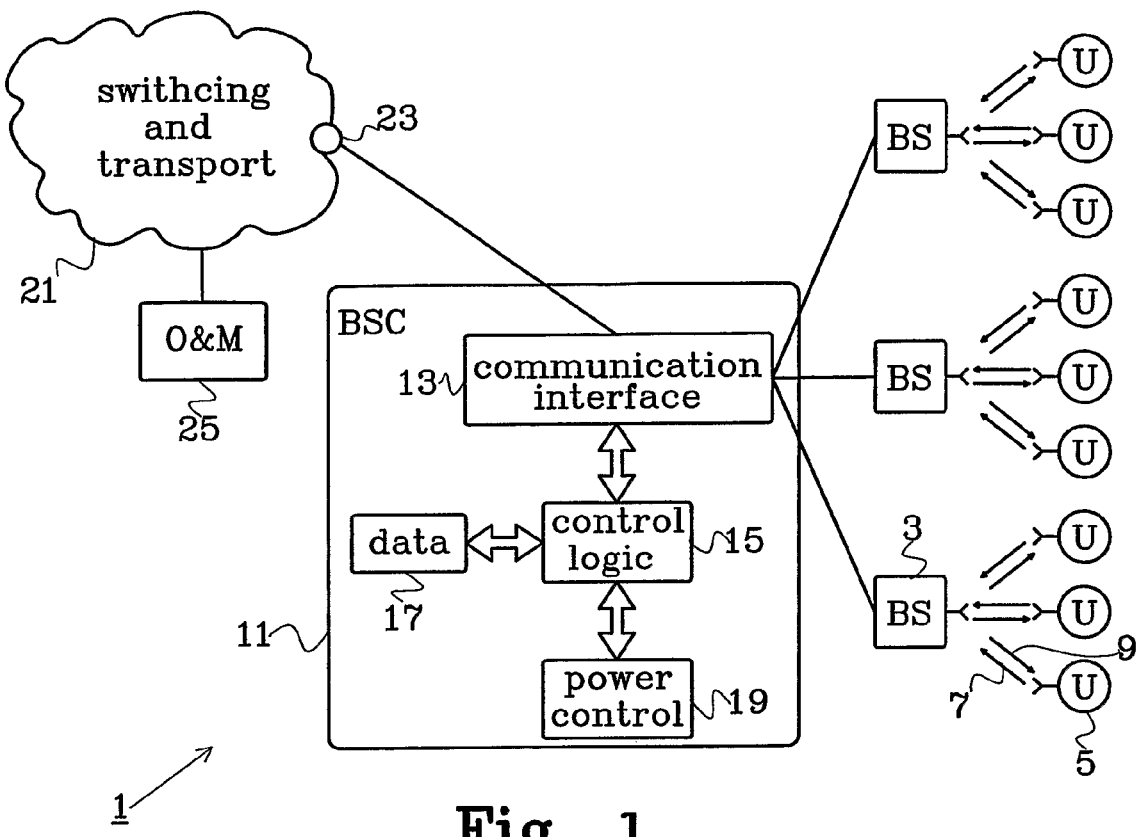
FIG. 1 is a block diagram of a cellular network.

FIG. 1 is a block diagram of a cellular network 1, in which the present invention may be used. The cellular network 1 includes a number of radio access nodes, here embodied as base stations (BS), which provide radio access services to a number of user terminals (U) located within cells associated with the base stations. In FIG. 1, one such base station is referenced with reference numeral 3, and one such user terminal is referenced with reference numeral 5. The user terminal 5 can be any device that includes or has access to suitable radio communication equipment for communicating with the base station 3, e.g. mobile or fixed radio telephones or computers equipped with radio communication cards. Communications between the base stations and the user terminals are performed over radio links: uplinks for transmissions from the user terminals to the base stations; and downlinks for transmissions from the base stations to the user terminals. Consequently, communications between the base station 3 and the user terminal 5 are performed using an assigned uplink 7 and an assigned downlink 9. The cellular network 1 further includes a control node, here embodied as a base station controller 11 (BSC). The BSC 11 is adapted for controlling various functions of the base stations and includes communication interface equipment 13 for connecting the BSC 11 to the base stations. A control logic unit 15 controls the basic operation of the BSC 11 using data and computer programs stored in a data storage unit 17. The BSC 11 further includes a power control unit 19 which operates a power control algorithm for controlling transmission powers on the radio links, as will be described in greater detail below. The communication interface equipment 13 is also connected to a switching and transport network 21 via a node 23, e.g. a switch or a router. In this example, the BSC 11 thus constitutes an intermediate node that connects the base stations to the switching and transport network 21. An O&M system 25 (Operation and Maintenance) is provided, allowing an operator of the cellular network 1 to perform operation and maintenance. In FIG. 1, there are three base stations connected to the BSC 11 and three user terminals connected the each base station. However, these numbers are just examples. There may be one or more additional base stations connected to the BSC 11, and the number of user terminals connected to each base station will of course change over time, as is understood by a person skilled in the art. Furthermore, the cellular network 1 may include one or more additional BSCs, each additional BSC controlling its own set of base stations.

Figure 2:
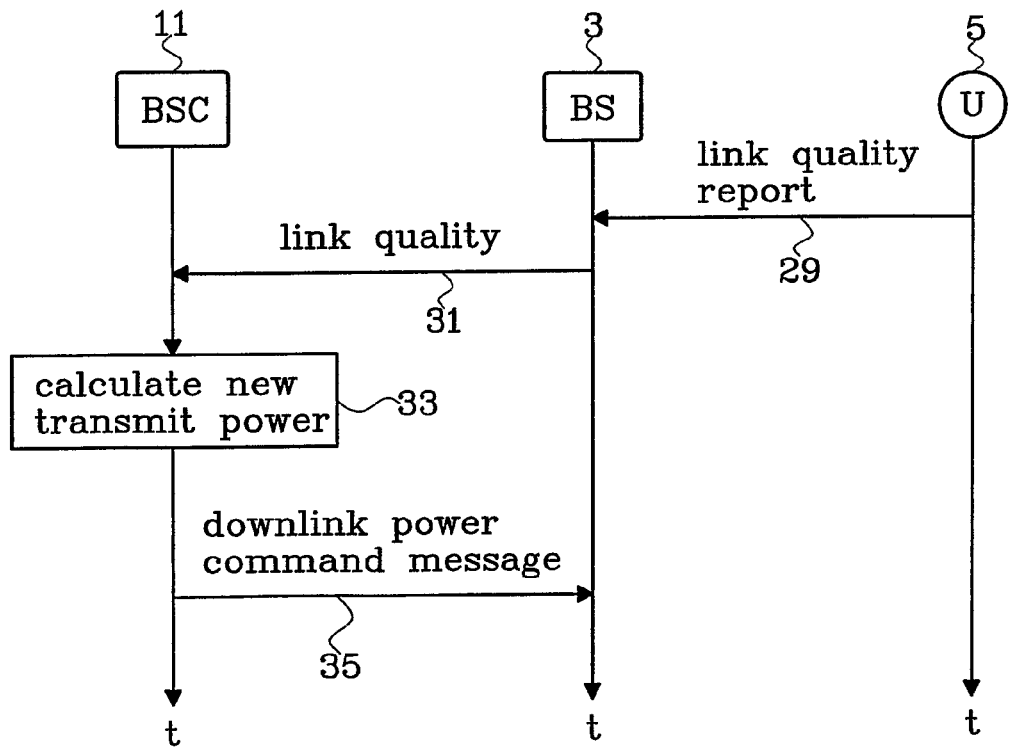
FIG. 2 is a signalling diagram illustrating downlink power control in a cellular network.

FIG. 2 is a signalling diagram illustrating the principles of conventional downlink power control. The user terminal 5 first transmits a link quality report 29 over the uplink 7 to the base station 3. The report 29 includes information on link quality, such as speech quality measured in terms of e.g. C/I, BER or FER, which has been received on the downlink 9 by the user terminal 5. A link quality transmission 31 from the base station 3 forwards information on the reported link quality to the BCS 11. The power controller 19 operates a power control algorithm that calculates a new transmission power for the downlink 9 based on the reported link quality. The new transmission power is communicated to the base station 3 in a downlink power command message 35. The power control algorithm of course controls the transmission powers on other downlinks in a corresponding manner. Furthermore, power control can be applied in a similar manner also for the uplinks. However, since the BSC 11 performs power control in this example, reports on uplink quality need not be sent to the user terminals from the base stations. Instead, each base station measures received link quality on uplinks associated with user terminals connected to the base station. The measured link qualities of the uplinks are transmitted to the BSC 11, which determines the transmission powers to be used on each uplink. Commands regarding transmission powers to be used are transmitted from the BSC 11 to the user terminals via the base stations.

It is not necessary for the power control to be performed in the BSC 11. Alternatively, power control can be performed from some other centralised node, e.g. node 23. Power control can also be performed in a decentralised manner, e.g. by each base station performing power control with respect to its own connections.

Figure 3:
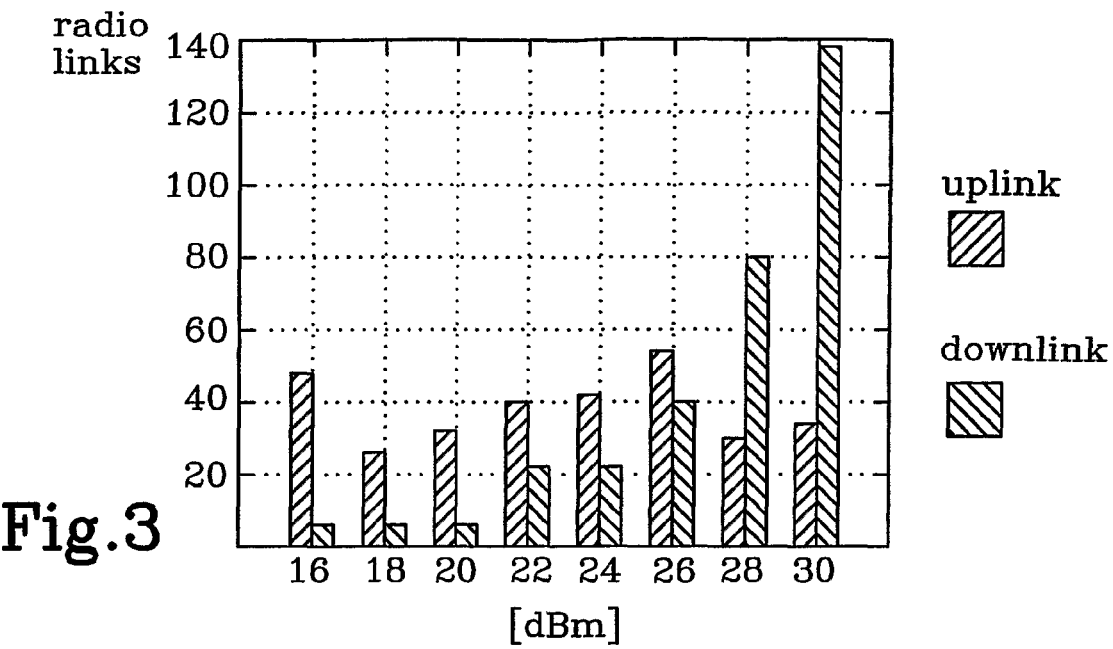
FIG. 3 is diagram illustrating a distribution of transmission powers.

The power control algorithm operated by e.g. the power controller 19 cannot select just any transmission powers for the radio links but is for practical reasons normally limited to a dynamic power range, i.e. a predetermined power interval extending from a minimum allowed transmission power (Pmin) to a maximum allowed transmission power. Due to a spread in link quality among the radio links, for example caused by different fading and interference conditions on the radio links, not all radio links will have the same transmission power. Consequently, there will be a distribution of radio link transmission powers in the dynamic power range. Such a distribution of transmission powers for a selected number of radio links is illustrated with a diagram in FIG. 3. In this diagram, transmissions on the radio links occur in a dynamic power range from 16 dBm to 30 dBm in discrete steps of 2 dBm. The diagram shows the number of uplinks and downlinks for each possible transmission power level in the dynamic power range. If the link quality of a radio link is below an acceptable level but the transmission power is already equal to Pmax, we say that the radio link is limited by Pmax. Conversely, if the link quality is above the acceptable level but the transmission power is equal to Pmin, we say that the radio link is limited by Pmin. In both cases, an undesirable situation has occurred. It is not unlikely that either Pmin or Pmax limits one or more of the radio links in FIG. 3. A preferred situation would be if no radio links were limited by Pmin and Pmax. However, due to the above-mentioned spread in link quality, this is usually not possible.

To improve the power control of radio links, it is suggested according to the invention to collect power distribution information indicating how the transmission powers on a selected plurality of radio links are distributed over the dynamic power range. Feedback, which is suitable for modifying the operation the power control algorithm, is then generated in dependence of the power distribution information. The feedback provides an opportunity to modify the operation of the power control algorithm such that an improved power distribution is achieved, for example with respect to limited radio links. The invention is applicable to both uplinks and downlinks. The selected plurality of radio links may be all radio links currently controlled by the power control algorithm but can also be a representative selection of radio links that does not include all controlled radio links. The selected plurality of radio links will normally change over time, e.g. due to establishment of new connections and/or termination of old connections.

Figure 7:
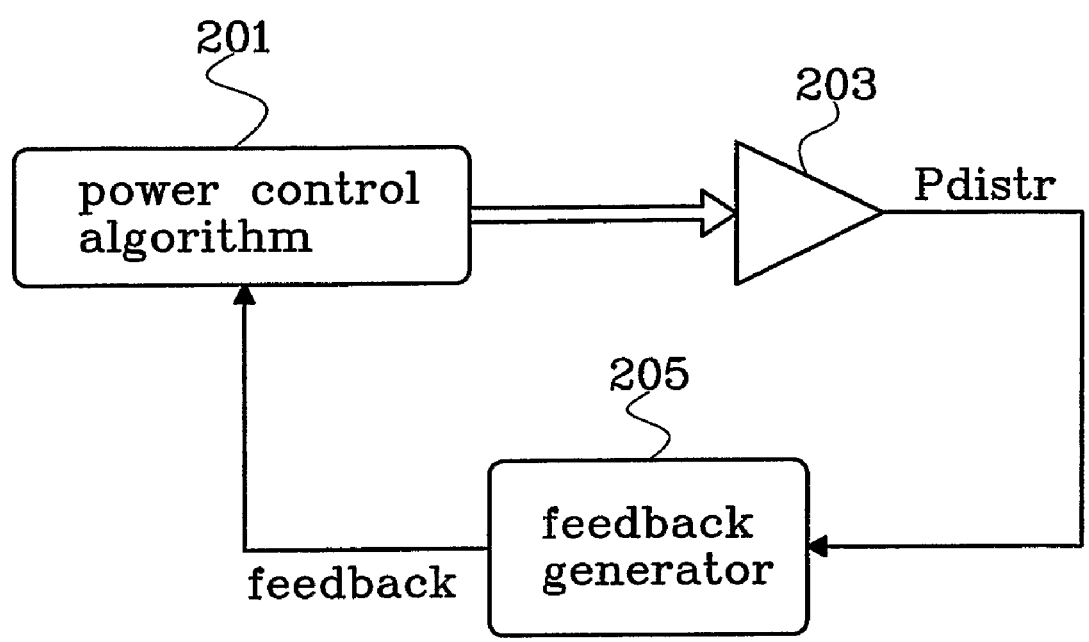
FIG. 7 is a block diagram illustrating an embodiment according to the invention.

The principles are illustrated schematically with a block diagram in FIG. 7. A power control algorithm 201 is operated to control transmission powers on radio links (downlinks and/or uplinks). An information collector 203 collects power distribution information Pdistr indicating how the transmission powers of the selected plurality of radio links are distributed in the dynamic power range. A feedback generator 205 is connected to the information collector 203 and adapted to receive the power distribution information Pdistr. The feedback generator 205 is adapted to generate feedback for modifying the operation of the power control algorithm 201.

Figure 4:
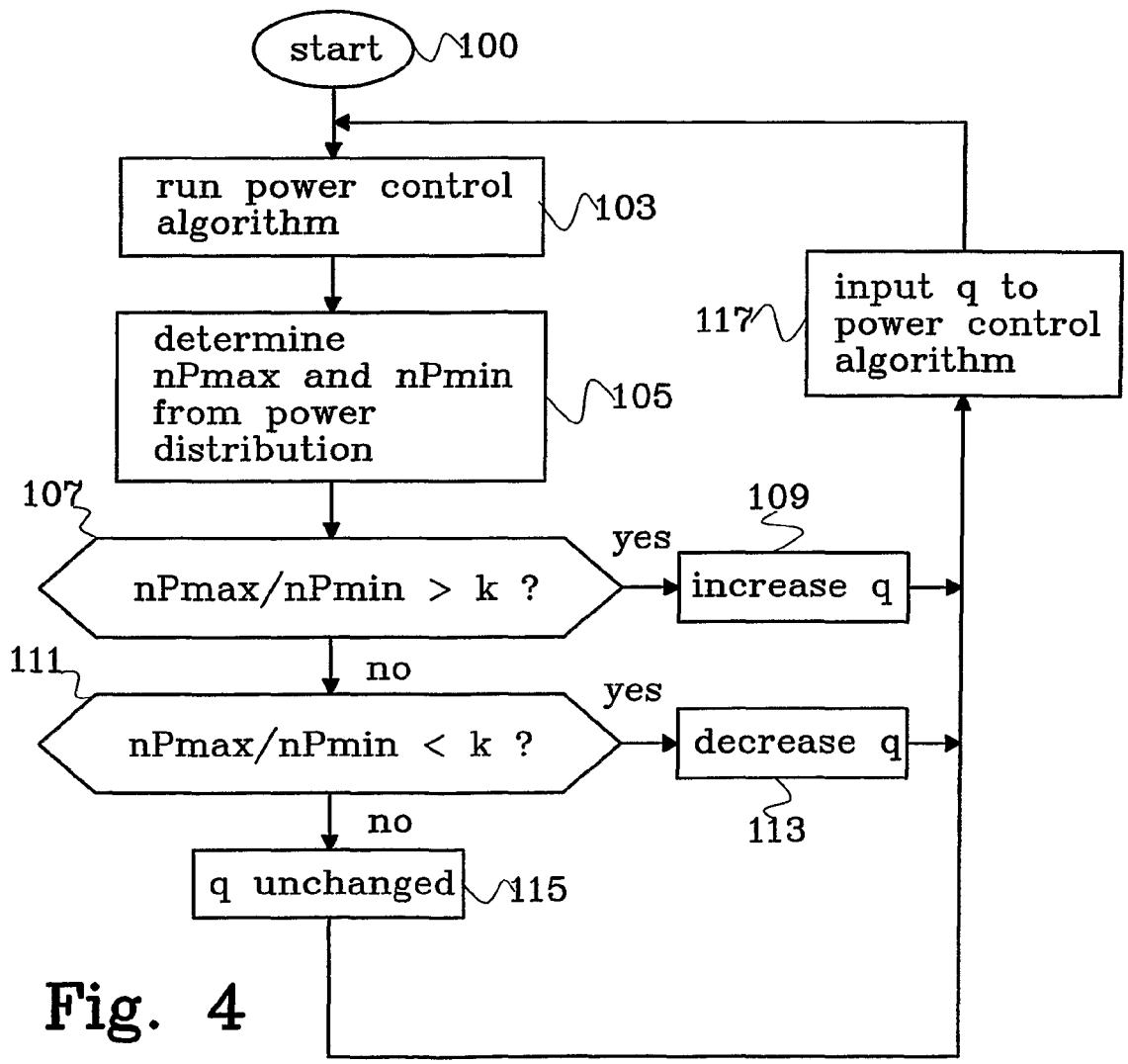
FIG. 4 is a flow chart illustrating an example of a method according to the invention.

According to one embodiment of the invention, the feedback generated by the feedback generator 205 includes a recalculation of one or more operational parameters of the power control algorithm. The recalculated operational parameter(s) can be automatically inputted to the power control algorithm (closed loop) or be submitted for approval, e.g. by the operator, prior to being inputted to the power control algorithm (open loop). FIG. 4 is a flow chart illustrating a concrete example. At a start 100, an operator performs an initial setting of operational parameters for a power control algorithm 201. In this example, the operational parameters include a target quality parameter q indicating a link quality above which the transmission power of a radio link should be reduced below Pmax to a level within the dynamic power range. At a block 103, the power control algorithm 201 is run. At a block 105, the information collector 203 collects power distribution information relating to the selected plurality of radio links. A first number nPmax indicating the number of radio links in the selected plurality of radio links that are limited by Pmax is determined based on the power distribution information. A second number nPmin indicating the number of radio links in the selected plurality of radio links that are limited by Pmin is determined based on the power distribution information. In the method of FIG. 4, a ratio of nPmax and nPmin is compared with a value k, and based on that comparison, a recalculation of the target quality parameter q is made. At a block 107, it is determined whether the ratio nPmax/nPmin is greater than the value k. If so, the recalculation of the target quality parameter results in an increase of the target quality parameter q at block 109, i.e. the recalculated target quality parameter is greater than the currently used target quality parameter. At a block 111, it is determined whether the ratio is smaller than the value k. If so, the recalculation of the target quality parameter q results in a decrease of the target quality parameter at a block 113, i.e. the recalculated target quality parameter is smaller than the currently used target quality parameter. If the ratio is equal to the value k, then at a block 115, the recalculated target quality parameter q is set equal to the target quality parameter q currently used by the power control algorithm, i.e. no change. At a block 117, the recalculated target quality parameter q is automatically inputted for use in the power control algorithm 201. The recalculation can of course be repeated one or more times, e.g. at predetermined points in time or at randomly selected points in time.

Figure 5:
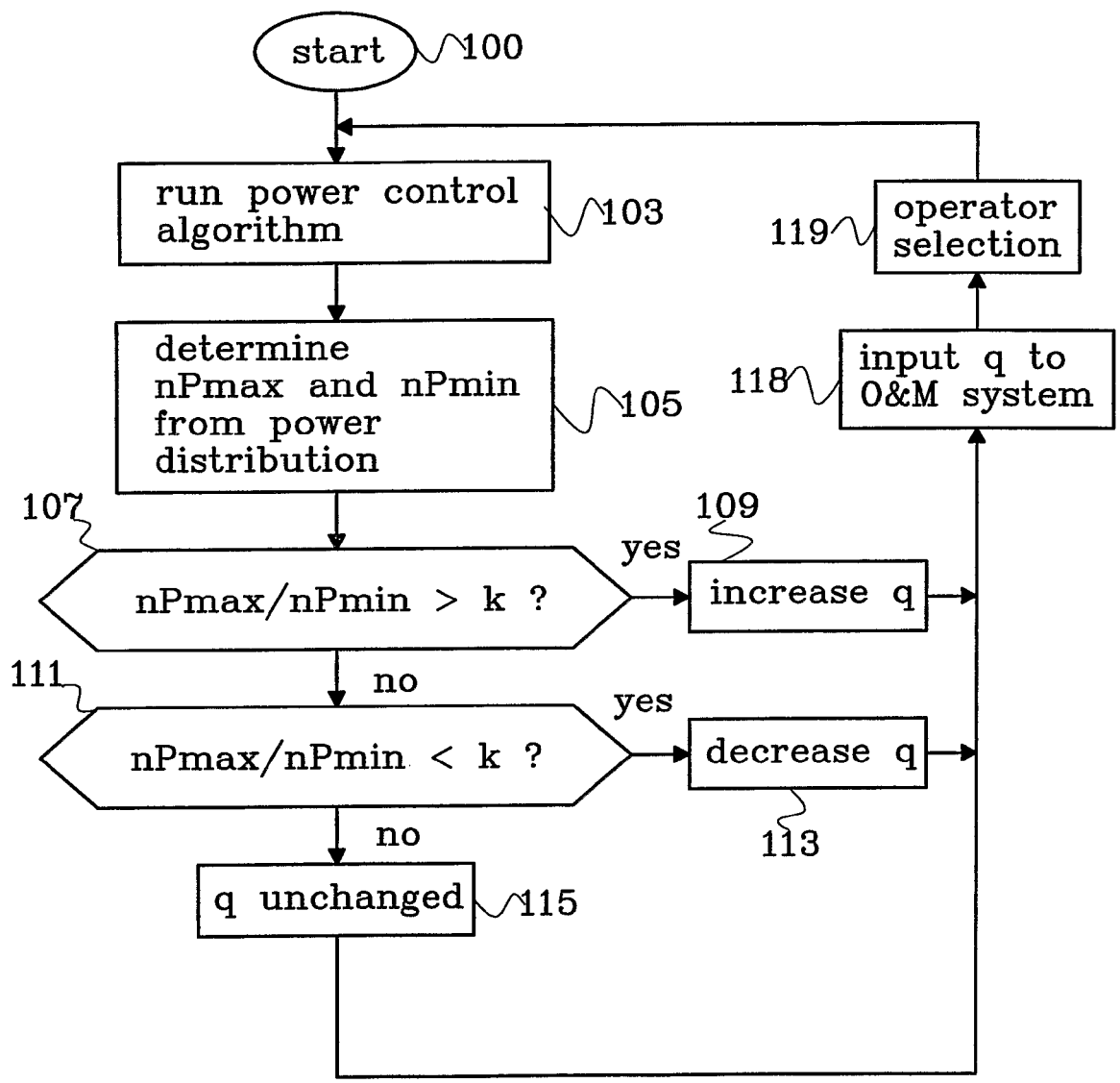
FIG. 5 is a flow chart illustrating an example of a method according to the invention.

FIG. 4 is an example of closed loop feedback, since the recalculated operational parameter (q) is automatically inputted for use in the control algorithm. FIG. 5 is a flow chart with a corresponding example of open loop feedback. Since the flow chart of FIG. 5 is largely the same as that of FIG. 4, only the differences will be elaborated on. At a block 118, the recalculated target quality parameter q is automatically inputted to an O&M system. At a block 119, the operator selects whether or not to use the recalculated target quality parameter q. The recalculated target quality parameter q will be inputted for use in the power control algorithm 201 only after approval by the operator. If the operator does not approve the recalculated target quality parameter q, the power control algorithm can continue using the current target quality parameter or a new target quality parameter selected by the operator. Again, the recalculation can be repeated one or more times, e.g. at predetermined points in time or at randomly selected points in time.

Note that in the examples of FIGS. 4 and 5, the target quality parameter q is defined such that a lower value indicates a higher link quality. This is, for example, the case for the above-mentioned qdes parameter used in GSM. If the target quality parameter is defined in the opposite sense, the inequalities in the blocks 107 and 111 should of course be reversed or interchanged.

In the examples of FIGS. 4 and 5, the value k can be said to be the wanted value for the ratio nPmax/nPmin. The wanted value of the ratio is achieved by recalculating the target quality parameter q, which influences the transmission powers that will be selected by the power control algorithm, and hence also the ratio nPmax/nPmin. For example, it is realistic to assume that radio links with high transmission powers are potentially stronger sources of interference compared to radio links with low transmission powers. It is therefore not optimal to merely set k equal to one (1), which can be seen as one way to approximately maximise the number of radio links that are not limited by any one of Pmin or Pmax. Instead, it is normally preferred to prioritise avoidance of Pmax over avoidance of Pmin. If so, the value k should be selected such that k<1.

Figure 6:
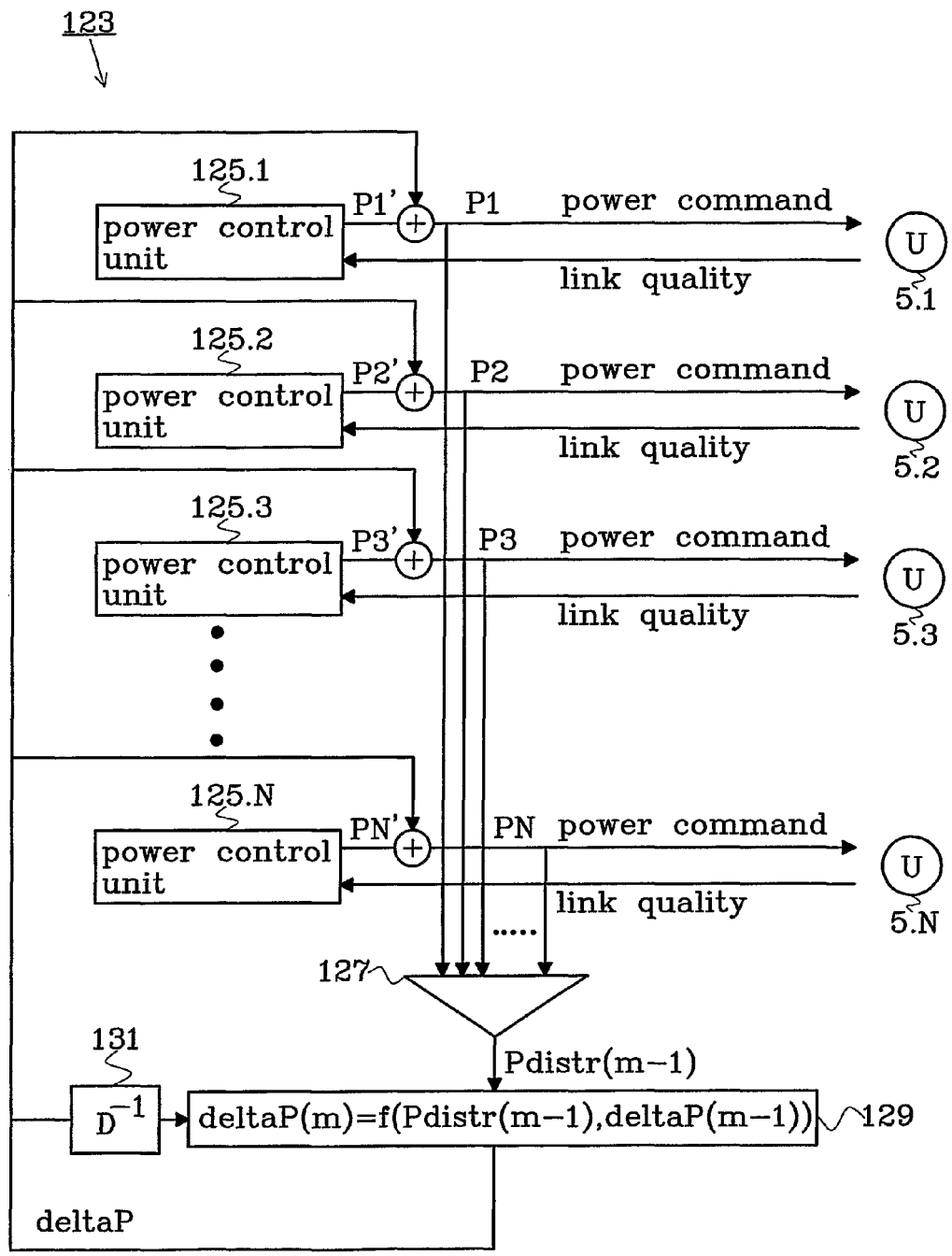
FIG. 6 is block diagram illustrating an embodiment of a power controller according to the invention.

According to another embodiment of the invention, the power control algorithm calculates suggested transmission powers for controlled radio links. The feedback is then used to modify the suggested transmission powers to obtain final transmission powers to be used on the controlled radio links. This is illustrated in FIG. 6, which is a block diagram of an embodiment of a power controller 123 according to the invention. The power controller 123 currently controls downlink transmission powers to a number of user terminals 5.1-5.N. The power controller 123 includes a number of power control units 125.1-125.N. Each power control unit 125.j has been designated for power control of a downlink to a respective user terminal 5.j. For example, power control unit 123.1 controls the downlink transmission power to user terminal 5.1 based on information on received link quality information reported by the user terminal 5.1 and forwarded to the power control unit 125.1 via a serving base station (not shown). Based on the link quality information, the power control unit 125.1 is adapted to generate a suggested transmission power P1' for the downlink to the user terminal 5.1. The suggested transmission power P1' is then modified by an offset value deltaP resulting in an actual transmission power P1 for the downlink to the user terminal 5.1. The power control unit 125.1 is adapted to transmit a power command to the serving base station informing the serving base station of the transmission power P1 for the downlink to the user terminal 5.1. The other control units 125.2-125.N are adapted to perform corresponding downlink power transmission control for their respective user terminals 5.2-5.N. The power controller 123 includes an information collector 127, which is connected to the power control units 125.1-125.N and adapted to receive information on the determined transmission powers P1-PN. The information collector 127 is adapted to generate power distribution information, which is received by a feedback generator, here embodied as an offset generator 129 connected to the information collector 127. The offset generator 129 is adapted to generate the offset value deltaP, which is used to modify the suggested downlink transmission powers P1'-PN'. The offset generator 129 is adapted to generate a new (updated) offset value deltaP(m), which is to be used in a next iteration of the power control algorithm, in dependence of the current power distribution information Pdistr(m−1) and the current offset value deltaP(m−1), which is stored in a delay element 131. The new offset value deltaP(m) is fed to the control units 125.1-125.N and the delay element 131.

The offset value deltaP can be updated in many different ways. Some examples are set out below.

The new offset value deltaP(m) can be generated by comparing an average power of the current transmission power distribution Pdistr(m−1) with a wanted average power MP, the purpose of the offset value deltaP(m) being to shift a location of the current power distribution Pdistr(m−1) such that the average power of the power distribution coincides with the wanted average power. Two similar examples are provided by eq. 1 and 2 below:

$$\text{delta}P(m)=MP-\text{mean}(P\text{distr}(m-1))+\text{delta}P(m-1) \quad \text{(eq. 1)}$$

$$\text{delta}P(m)=MP-\text{median}(P\text{distr}(m-1))+\text{delta}P(m-1) \quad \text{(eq. 2)}$$

where MP defines the wanted mean value or median value of the power distribution. In this way the transmission power distribution is prevented from sliding away from an e.g. centered position between the two power limits Pmin and Pmax.

Another way to generate the new offset value deltaP(m) is to determine a fraction of the radio links for which the transmission powers are equal to Pmax and compare the determined fraction with a wanted fraction value. The new offset value deltaP(m) is calculated based on the comparison between the determined fraction and wanted fraction with the aim to change the transmission power distribution such that the fraction of radio links that transmit with Pmax becomes equal to the wanted fraction. The following equation may, for example, be used for this purpose:

$$\text{delta}P(m)=r*(\text{PERC}-100*n P\max(m-1)/n\text{TOT}(m-1))+\text{delta}P(m-1) \quad \text{(eq. 3)}$$

where PERC is a wanted percentile of radio links transmitting at Pmax. nTOT is a current total number of user terminals and r is a scaling factor that helps avoiding instability.

A third example takes the relationship between nPmax and nPmin into account and compares the ratio nPmax/nPmin with a wanted ratio value k. The new offset value is generated based on the current offset value and on the comparison with the wanted ratio value k. The following equation may, for example, be used for this purpose:

$$\text{delta}P(m)=r*(1-n P\max(m-1)/(k*n P\min(m-1)))+\text{delta}P(m-1) \quad \text{(eq. 4)}$$

Here nPmax, nPmin and k are as in the examples of FIGS. 4 and 5. The parameter r has the same function as in eq. 3.

In the example of FIG. 6, the power controller 123 is adapted to control downlink transmission powers. However, the power controller 123 may also, or alternatively, be adapted to control uplink transmission powers mutatis mutandis. The power controller 123 can be part of a centralised control node, such as a base station controller. Alternatively, the power controller 123 can be arranged in decentralised manner in the cellular network.

The invention also includes the method by which the power controller 123 is arranged to operate, the steps of such a method being readily apparent to the skilled person from the above.

The invention can be used in all types of cellular networks where the invention would be suitable. For example the invention can be used in conventional cellular networks, such as mobile phone networks, Mobile IP networks, wireless data networks etc.

It should be noted that the embodiments described above are just examples of how the invention can be achieved. The scope of protection is instead defined by the following claims.

The invention claimed is:

1. A method relating to power control in a cellular network in which a power control algorithm is operated to control transmission powers on radio links within a predetermined dynamic power range extending from a minimum power level to a maximum power level, the method being characterised by:
    obtaining power distribution information indicating how the transmission powers on a selected plurality of controlled radio links are distributed in the dynamic power range; and
    generating feedback for modifying the operation of the power control algorithm in dependence of the power distribution information, wherein the step of generating feedback includes recalculating at least one operational parameter used by the power control algorithm, and wherein the step of recalculating the at least one operational parameter includes recalculating a target quality parameter.

2. The method according to claim 1, wherein the method includes automatically inputting the at least one recalculated operational parameter to the power control algorithm.

3. The method according to claim 1, wherein the method includes:
    submitting the at least one recalculated operational parameter for approval; and
    if approved, inputting the at least one recalculated operational parameter to the power control algorithm.

4. The method according to claim 1, wherein the method includes:
    determining a first value indicating the number of radio links in the selected plurality of radio links that are limited by the maximum power level;
    determining a second value indicating the number of radio links in the selected plurality of radio links that are limited by the minimum power level; and
    comparing a ratio of the first value and the second value with a wanted ratio value, and wherein the step of recalculating the target quality parameter is performed in dependence of the step of comparing the ratio of the first value and the second value with the wanted ratio value.

5. A method relating to power control in a cellular network in which a power control algorithm is operated to control transmission powers on radio links within a predetermined dynamic power range extending from a minimum power level to a maximum power level, the method being characterised by:
- obtaining power distribution information indicating how the transmission powers on a selected plurality of controlled radio links are distributed in the dynamic power range; and
- generating feedback for modifying the operation of the power control algorithm in dependence of the power distribution information, wherein the power algorithm generates suggested transmission powers for radio links that are controlled by the power control algorithm, and wherein the step of generating feedback includes generating an offset value for modifying the suggested transmission powers.

6. The method according to claim 5 wherein a new offset value is generated based on a current offset value and the power distribution information.

7. The method according to claim 6, wherein the method includes:
- determining an average transmission power based on the power distribution information; and
- comparing the determined average transmission power value with a wanted average transmission power value, and wherein the new offset value is generated based on the current offset value and the step of comparing the determined average transmission power value with the wanted average transmission power value.

8. The method according to claim 7, wherein the determined average transmission power value is a mean value.

9. The method according to claim 7, wherein the determined average transmission power value is a median value.

10. The method according to claim 6, wherein the method includes:
- determining based on the power distribution information a fraction of radio links for which the transmission powers are equal to the maximum power level; and
- comparing the determined fraction with a wanted fraction value, and wherein the new offset value is calculated based the current offset value and the step of comparing the determined fraction with the wanted fraction value.

11. The method according to claim 6, wherein the method includes:
- determining a first value indicating the number of radio links in the selected plurality of radio links that are limited by the maximum power level;
- determining a second value indicating the number of radio links in the selected plurality of radio links that are limited by the minimum power level; and
- comparing a ratio of the first value and the second value with a wanted ratio value, and wherein the new offset value is generated based on the current offset value and the step of comparing the ratio of the first value and the second value with the wanted ratio value.

12. The power controller adapted to perform a method according to claim 1.

13. The control node for a cellular network, the control node including a power controller according to claim 12.

14. The control node according to claim 13, wherein the control node is a base station controller.

15. An apparatus for a cellular network in which a power control algorithm is operated to control transmission powers on radio links within a predetermined dynamic power range extending from a minimum power level to a maximum power level, the apparatus being characterised by comprising:
- an information collector for collecting power distribution information indicating how transmission powers of a selected plurality of controlled radio links are distributed in the dynamic power range;
- a feedback generator for generating feedback for modifying the operation of the power control algorithm in dependence of the power distribution information, wherein the power control algorithm generates suggested transmission powers for radio links that are controlled by the power control algorithm, and wherein the feedback generator is adapted to generate an offset value for modifying the suggested transmission powers.

16. The apparatus according to claim 15, wherein the feedback generator is adapted for recalculating at least one operational parameter used by the power control algorithm.

17. The apparatus according to claim 15, wherein the apparatus is located in a control node of the cellular network.

* * * * *

UNITED STATES PATENT AND TRADEMARK OFFICE
CERTIFICATE OF CORRECTION

PATENT NO.         : 7,979,084 B2
APPLICATION NO.    : 11/912238
DATED              : July 12, 2011
INVENTOR(S)        : Thurfjell et al.

It is certified that error appears in the above-identified patent and that said Letters Patent is hereby corrected as shown below:

On the Face Page, in Field (75), under "Inventors", in Column 1, Line 1, delete "Lulea" and insert -- Luleå --, therefor.

On the Face Page, in Field (75), under "Inventors", in Column 1, Line 2, delete "Hagglund," and insert -- Hägglund, --, therefor.

Signed and Sealed this
Thirteenth Day of March, 2012

David J. Kappos
*Director of the United States Patent and Trademark Office*